United States Patent
Borra et al.

(10) Patent No.: US 10,936,308 B2
(45) Date of Patent: Mar. 2, 2021

(54) MULTI-TENANT COLLABORATIVE LEARNING

(71) Applicant: salesforce.com, inc., San Francisco, CA (US)

(72) Inventors: Ajay Krishna Borra, San Francisco, CA (US); Manpreet Singh, San Francisco, CA (US); Himanshu Mittal, San Francisco, CA (US); Edet Nkposong, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

(21) Appl. No.: 15/966,445

(22) Filed: Apr. 30, 2018

(65) Prior Publication Data
US 2019/0332376 A1   Oct. 31, 2019

(51) Int. Cl.
*G06F 8/75* (2018.01)
*G06F 11/34* (2006.01)
*G06F 8/41* (2018.01)
*G06F 8/77* (2018.01)
*G06F 16/28* (2019.01)

(52) U.S. Cl.
CPC ............... *G06F 8/75* (2013.01); *G06F 8/427* (2013.01); *G06F 8/77* (2013.01); *G06F 11/3476* (2013.01); *G06F 16/285* (2019.01); *G06F 16/289* (2019.01)

(58) Field of Classification Search
CPC ..... G06F 8/71; G06F 8/73; G06F 8/75; G06F 8/77; G06F 16/285; G06F 16/289; G06F 8/427; G06F 11/3476
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,617 B1 | 5/2001 | Rothwein et al. | |

(Continued)

*Primary Examiner* — Wei Y Zhen
*Assistant Examiner* — Brahim Bourzik
(74) *Attorney, Agent, or Firm* — Schwabe Williamson & Wyatt

(57) ABSTRACT

Systems, methods, and computer-readable media are provided for a multi-tenant collaborative learning environment, where information from all tenants in a multi-tenant system is collected and used to provide individual tenants with code fixes and/or optimization recommendations based on the collected information. Other embodiments may be described and/or claimed.

20 Claims, 12 Drawing Sheets

(56) References Cited

U.S. PATENT DOCUMENTS

| | | |
|---|---|---|
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,745,383 B1 * | 6/2004 | Agarwal ............ G06F 11/3495 714/39 |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,563 B1 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,197 B1 | 6/2006 | Desai |
| 7,069,231 B1 | 6/2006 | Cinarkaya |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,685,572 B1 * | 3/2010 | Qiao ................ G06F 11/3604 717/126 |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,134,976 B1 * | 9/2015 | Ezick ................ G06F 8/43 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0150876 A1 * | 6/2007 | Lakshminarasimhan ................ G06F 8/427 717/137 |

(56) References Cited

U.S. PATENT DOCUMENTS

| | | |
|---|---|---|
| 2008/0016496 A1* | 1/2008 | Li .................... G06F 11/3624 717/124 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0181798 A1* | 6/2014 | Narayanan .............. G06F 8/427 717/143 |
| 2014/0214798 A1* | 7/2014 | Nica ................ G06F 16/24542 707/718 |
| 2014/0282371 A1* | 9/2014 | Hirsch .................... G06F 8/36 717/106 |
| 2014/0331203 A1* | 11/2014 | Elshishiny .......... G06F 11/3676 717/124 |
| 2014/0359537 A1 | 12/2014 | Jackobson et al. |
| 2017/0010952 A1* | 1/2017 | Nandakumar ........... G06F 8/30 |
| 2017/0091073 A1* | 3/2017 | Abadi ..................... G06F 8/00 |
| 2017/0212826 A1* | 7/2017 | Chandra ............ G06F 11/3664 |
| 2017/0371629 A1* | 12/2017 | Chacko .................... G06F 8/36 |
| 2019/0018967 A1* | 1/2019 | Ramasamy ........... G06F 21/577 |
| 2019/0243617 A1* | 8/2019 | Stevens .................... G06F 8/35 |
| 2019/0243622 A1* | 8/2019 | Allamanis ................ G06F 8/72 |
| 2019/0324727 A1* | 10/2019 | Carranza ............ G06F 11/3604 |

* cited by examiner

MULTI-TENANT COLLABORATIVE LEARNING

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to database and cloud computing systems, and in particular to systems and methods for identifying and applying code fixes and code optimizations in multi-tenant and/or cloud computing systems.

BACKGROUND

In multi-tenant database systems (also referred to as "multi-tenant systems"), customer organizations (also referred to as "tenants") may share database resources. The databases themselves are typically shared, and each tenant is typically associated with an tenant identifier (tenant_id) column or field that may be used to identify rows or records belonging to each tenant. Each tenant may provide their own custom data, which may include defining custom objects and custom fields, as well as designating one or more custom fields to act as custom index fields. Users of a multi-tenant system (e.g., a tenant or developers associated with a tenant) may develop applications or platforms that interact or integrate with the multi-tenant system and utilize data from an associated tenant space. The applications/platforms may obtain data from the associated tenant space to render/display visual representations of relevant tenant data, access and manipulate data in the tenant space, and/or perform various other actions. Additionally, each tenant may have the capability to write their own code in a specific or desired language, and/or write their own queries to access data from their tenant space.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
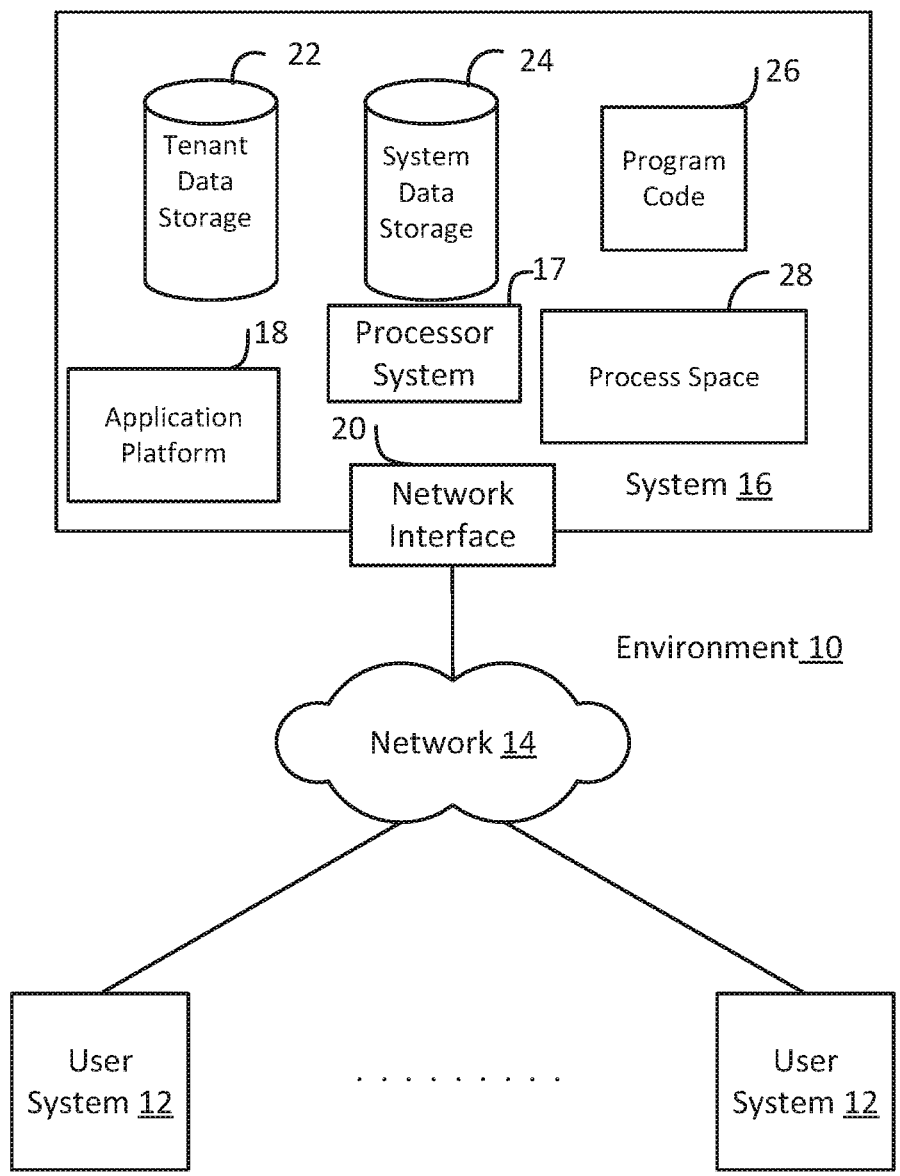
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

As used herein, the term "tenant" may include a group of users who share common access with specific privileges to a software instance. A multi-tenant architecture, such as those discussed herein, may provide a tenant with a dedicated share of a software instance typically including one or more of tenant specific data, user management, tenant-specific functionality, configuration, customizations, non-functional properties, associated applications, etc. Multitenancy contrasts with multi-instance architectures, where separate software instances operate on behalf of different tenants. As used herein, the term an "instance" may refer to a concrete occurrence of an object, which may occur, for example, during execution of program code, and the terms "instantiate", "instantiation", and the like may refer to the creation of an instance.

As used herein, the terms "resource," "computing resource," "hardware resource," etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. As used herein, the term "network resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable. Additionally, a "virtualized resource" may refer to compute, storage, and/or network resources provided by virtualization infrastructure to an application, such as a mobile edge application. Moreover, the term "resource" may refer to the particular resource being accessed or an address or other means of accessing the resource.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif., salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

Figure 1B:
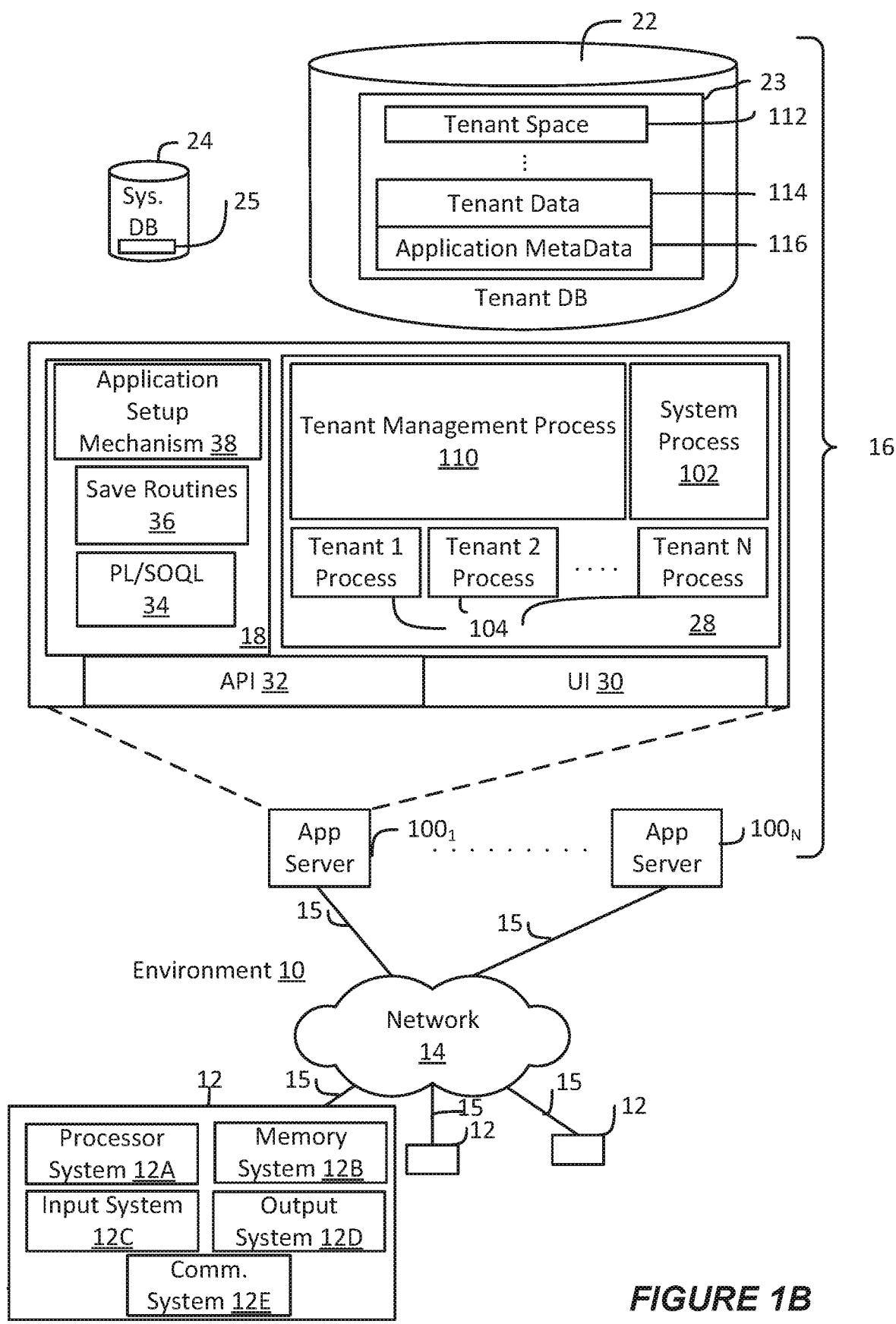
FIG. 1B shows a block diagram of example implementations of elements of FIG. 1A and example interconnections between these elements according to some implementations.

The system 16 may be a multi-tenant database system and/or a cloud computing service comprising a system and/or network of computer devices (e.g., servers, storage devices, applications, etc., such as those discussed with regard to FIGS. 1A-1B infra) that provides access to a pool of physical and/or virtual resources. In some implementations, the system 16 may provide an Infrastructure as a Service (IaaS) platform, a Platform as a Service (PaaS) cloud service platform, and/or other like services.

In embodiments, the tenant data storage 22, the system data storage 24, and/or some other data store (not shown) may include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16. The applications of the application platform 18 may be developed with server-side programming languages, such as PHP, Java and/or Java Server Pages (JSP), Node.js, ASP.NET, and/or any other like technology that renders HTML. The applications may be built using a platform-specific and/or proprietary development tool and/or programming languages, such as Salesforce® Apex and/or the like.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a local area network (LAN), a wireless LAN (WLAN), wide area network (WAN), telephone network, wireless network, cellular network, point-to-point network, star network, token ring network, hub network, or other appropriate configuration including proprietary and/or enterprise networks, or combinations thereof. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. The network 14 may comprise one or more network elements, each of which may include one or more processors, communications systems (e.g., including network interface controllers, one or more transmitters/receivers connected to one or more antennas, etc.), and computer readable media. Examples of such network elements may include wireless APs (WAPs), a home/business server (with or without radio frequency (RF) communications circuitry), routers, switches, hubs, radio beacons, (macro or small-cell) base stations, servers (e.g., stand-alone, rack-mounted, blade, etc.), and/or any other like devices/systems. Connection to the network 14 may be via a wired or a wireless connection using one or more of the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. Connection to the network 14 may require that the various devices and network elements execute software routines which enable, for example, the seven layers of the open systems interconnection (OSI) model of computer networking or equivalent in a wireless network.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Session Initiation Protocol (SIP) with Real-Time Transport Protocol (RTP or Secure RTP (SRTP), Web-based secure shell (SSH), Extensible Messaging and Presence Protocol (XMPP), WebSocket protocol, etc. In an example where HTTP is used, each user system 12 can include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include code or source code documents, e.g., HTML, Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), database objects, or some other like object(s)/document(s). Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device (e.g., Personal Data Assistants (PDAs), pagers, portable media player, etc.), a mobile cellular phone (for example, a "smartphone"), or any other WiFi-enabled device, WAP-enabled device, or other computing device capable of interfacing directly or indirectly to the Internet or other network (e.g., network 14). The terms "user system", "computing device", "computer system", or the like may be used interchangeably herein with one another and with the term "computer."

As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, to execute and render web applications allowing a user (for example, a subscriber of on-demand services provided by the system 16) of the user system 12 to access, process and view information, pages, interfaces, and applications available to it from the system 16 over the network 14. In other implementations, each user system 12 may operate a user (or third party) application designed to interact with applications of the application platform 18 allowing a user (for example, a subscriber of on-demand services provided by the system 16) of the user system 12 to access, process and view information, pages and applications available to it from the system 16 over the network 14. In some cases, an owner/operator of database system 16 may have pre-built the web or user applications for use by clients, customers, and/or agents of a tenant organization (org) to access a tenant space or enterprise social network of that tenant org. In some cases, developers associated with a tenant org may build custom application(s) for interacting with the tenant data. The user (or third party) application(s) may be native application(s) (e.g., executed and rendered in an application container) or hybrid application(s) (e.g., web applications being executed/rendered in an application container or skeleton). The user (or third party) application(s) may be platform-specific, or developed to operate on a particular type of user system 12 or a particular (hardware and/or software) configuration of a user system 12. The term "platform-specific" may refer to the platform implemented by the user system 12, the platform implemented by the database system 16, and/or a platform of a third party system.

In an example, the user systems 12 may implement web, user, or third party applications to request and obtain data from database system 16, and render graphical user interfaces (GUIs) in an application container or browser. In some implementations, the GUIs may include a data analytics GUI, such as Salesforce® Wave™ dashboard, which may provide visual representations of data residing in an enterprise cloud or in an on-demand services environment (e.g., a tenant space within database system 16). The GUIs may include one or more components (e.g., graphical control elements (GCEs), tabs, reports, dashboards, widgets, pages, etc.). Examples of such components may include audio/video calling components, messaging components (e.g., chat, instant messaging, short message service (SMS)/multimedia messaging service (MMS) messaging, emailing, etc.), and visualization components. The visualization components may enable a user of a user system 12 to select visualization parameters (also referred to as "lens parameters" or "filters") for displaying data from one or more datasets. A dataset may be a specific view or transformation of data from one or more data sources (e.g., a tenant space of database 22, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within a particular GUI, etc. The graphs/charts/maps to be displayed may be referred to as a "lens" or a "dashboard". A lens may be a particular view of data from one or more datasets, and a dashboard may be a collection of lenses. In some implementations, a GUI may display lenses, dashboards, and/or control panels to alter or rearrange the lenses/dashboards. Furthermore, the various application(s) discussed herein may also enable the user system 12 to provide authentication credentials (e.g., user identifier (user_id), password, personal identification number (PIN), digital certificates, etc.) to the database system 16 so that the database system 16 may authenticate the identity of a user of the user system 12.

The web, user, or third party application(s) discussed herein may be a software, program code, logic modules, application packages, etc. that are built using website development tools and/or programming languages, such as HTML, CSS, JavaScript, JQuery, and the like; and/or using platform-specific development tools and/or programming languages (e.g., Salesforce® Apex, Salesforce® Visualforce®, Salesforce® Lightning®, Salesforce® Wave™ Dashboard Designer, Salesforce® Force.com® IDE, Android® Studio™ integrated development environment (IDE), Apple® iOS® software development kit (SDK), etc.). Furthermore, such applications may utilize a suitable querying language to query and store information in an associated tenant space, such as Structure Query Language (SQL), object query language (OQL), Salesforce® OQL (SOQL), Salesforce® object search language (SOSL), Salesforce® analytics query language (SAQL), and/or other like query languages.

Each user system 12 typically includes an operating system (OS) to manage computer hardware and software resources, and provide common services for various applications. The OS may include one or more drivers and/or APIs that provide an interface to hardware devices thereby enabling the OS and applications to access hardware functions. In some embodiments, the OS may include middleware that may connect two or more separate applications or connect applications with underlying hardware components beyond those available from OS and/or the drivers/APIs. The OS may be a general purpose operating system or an operating system specifically written for and tailored to the user system 12.

Each user system 12 also typically includes one or more user input devices, such as a keyboard, a mouse, a trackball, a touch pad, a touch screen, a pen or stylus or the like, for interacting with a GUI provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using one or more central processing units (CPUs) and/or other like computer processing devices (see e.g., processor system 12B of FIG. 1B). Similarly, the system 16 (and additional instances of an MTS, where more than one is present) and all of its components can be operator-configurable using application(s) including computer code to run using the processor system 17, which may include one or more CPUs/processors. Examples of the processors/CPUs of processor system 17 may include one or multiple Intel Pentium® or Xeon® processors, one or more AMD Epyc® processors, or the like.

The system 16 includes tangible computer-readable media having non-transitory instructions stored thereon/in that are executable by or used to program a server (e.g., the app servers 100 or other servers discussed herein) or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.), FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E.

The processor system 12A can include any suitable combination of one or more processors, such as one or more central processing units (CPUs) including single-core or multi-core processors (such as those discussed herein), one or more graphics processing units (GPUs), one or more field-programmable gate arrays (FPGAs), or any other electronic circuitry capable of executing program code and/or software modules to perform arithmetic, logical, and/or input/output operations. As examples, the processor system 12A may include Intel® Pentium® or Core™ based processor(s); Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); or the like.

The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The memory system 12B may store program code for various applications (such as the various application discussed herein) for carrying out the procedures, processes, methods, etc. of the embodiments discussed herein, as well as an operating system (OS) and one or more databases. The OS may manage computer hardware and software resources, and provide common services for the applications via one or more drivers and/or APIs that provide an interface to hardware devices thereby enabling the OS and applications to access hardware functions. The memory system 12B may also include middleware that may connect two or more separate applications or connect applications with underlying hardware components beyond those available from OS and/or the drivers/APIs. The OS may be a general-purpose operating system or an operating system specifically written for/tailored to the user system 12.

The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

The communications system 12E may include circuitry for communicating with a wireless network or wired network. Communications system 12E may be used to establish a link 15 (also referred to as "channel 15," 'networking layer tunnel 15," and the like) through which the user system 12 may communicate with the database system 16. Communications system 12E may include one or more processors (e.g., baseband processors, network interface controllers, etc.) that are dedicated to a particular wireless communication protocol (e.g., Wi-Fi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches; filters; amplifiers; antenna elements; wires, ports/receptacles/jacks/sockets, and plugs; and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

In FIG. 1B, the network interface 20 is implemented as a set of HTTP application servers $100_1$-$100_N$. Each application server 100 (also referred to herein as an "app server", an "application programming interface (API) server", a "worker node", and/or the like) is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' ("app developers") creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

In various implementations, application platform 18 may be a development environment, programming language, and/or tools (collectively referred to as a "development environment", "dev-environment" and the like) that allows app developers to create/edit applications for implementing the various embodiments discussed herein. As examples, the dev-environment may be or include a software development environment (SDE), an integrated development environment (IDE), a software development kit (SDK), a software development platform (SDP), a schema builder, a modeling language application, a source code editor, build automation tools, debugger, compiler, interpreter, and/or some other like platform, framework, tools, etc. that may assist an app developer in building applications, configurations, definitions, and/or the like. In some implementations, the dev-environment may be a standalone application, or may be a web-based or cloud-based environment (e.g., a native application, a web application, or a hybrid application including GUIs that render an SDE/IDE/SDK/SDP implemented by a backend service (e.g., database system 16, a cloud service provider, etc.) in a web browser or application container).

The system 16 of FIG. 1B also includes a user interface (UI) 30 and an API 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection 15. For example, one application server $100_1$ can be coupled via the network 14 (for example, the Internet), another application server $100_{N-1}$ can be coupled via a direct network link 15, and another application server $100_N$ can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. In this regard, each application server 100 may be configured to perform various database functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to art MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. As used herein, a "database object", "data object", or the like may refer to any representation of information in a database that is in the form of an object or tuple, and may include variables, data structures, functions, methods, classes, database records, database fields, database entities, associations between data and database entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Example Implementation

Figure 2:
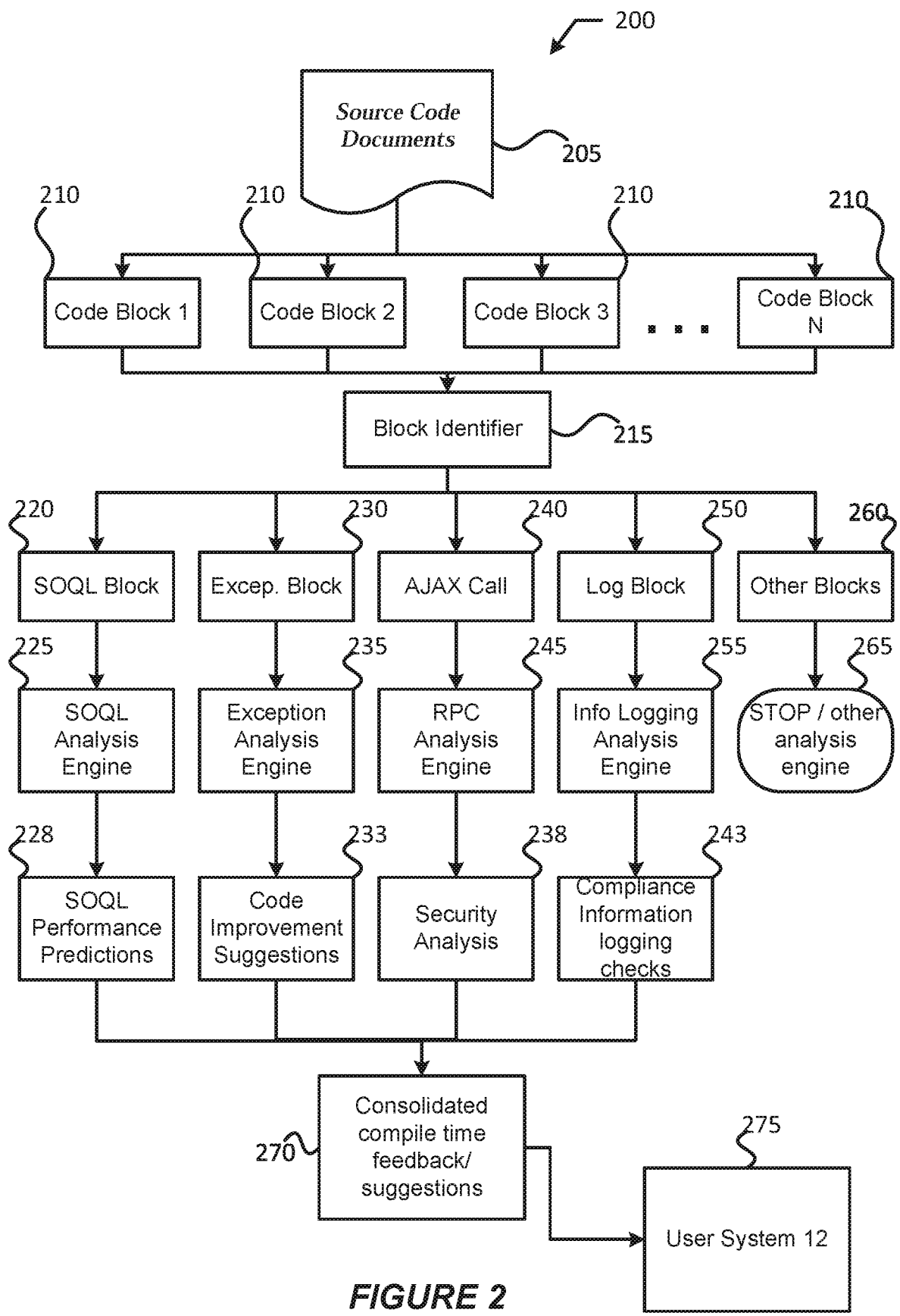
FIG. 2 illustrates an example multi-tenant collaborative learning architecture according to various embodiments.

FIG. 2 illustrates an example multi-tenant collaborative learning architecture 200 (also referred to as "collaborative learning environment 200" or the like) in accordance with various embodiments. A multi-tenant database system (e.g., system 16 discussed with regard to FIGS. 1A-1B) may include multiple tenants operating in the same environment. As alluded to previously, the tenants (or developers associated with the tenants) may develop applications and/or platforms (e.g., stored in the application metadata 116 discussed with regard to FIGS. 1A-1B) that interact and integrate with the multi-tenant platform 16 in order to utilize data from an associated tenant space 112. Additionally, each tenant may have the capability to write their own code in a specific or desired language, and/or write their own queries to access data from their tenant space. Although, tenants may operate in different industries or provide different services than other tenants, there may be commonalities between how tenants develop and maintain their applications and platforms. For example, many tenants may make the same or similar programming mistakes and may also make the same or similar educated passes (or go through the same or similar process) to resolve those mistakes. In another example, many tenants may write similar queries to access their tenant space 112, and these queries may or may not be the most optimal query in terms of resource consumption and/or speed of access.

According to various embodiments, the multi-tenant system 16 may implement or operate a collaborative learning environment (CLE) 200, where information from all tenants in the multi-tenant system 16 is collected and used to provide individual tenants with code fixes and/or optimization recommendations based on the collected information. For example, in FIG. 2, one or more source code documents 205 may be obtained by the CLE 200. Individual source code documents 205 may constitute a collection of computer instructions written using one or more programming languages, which when executed by one or more processor systems, may cause a computer system to perform one or more actions, such as various methods, procedures, functions, etc. These processor systems may include the processor system 17 of the multi-tenant system 16 and/or processor systems of various computer systems operated by individual tenants (also referred to as "tenant systems" or the like). As used herein, the term "tenant platform" may refer to a tenant system that operates one or more applications developed by that tenant.

The source code documents 205 may be written in any suitable programming or scripting language. As examples, the source code documents 205 may comprise Apex documents, JSON documents, XML documents, HTML documents, Visualforce® documents/pages, etc. The source code documents 205 may primarily constitute code blocks 210 written for specific applications or tenant platforms, and/or business logic. In many cases, a tenant may produce source code documents 205 that may be connected to, or otherwise call procedures or methods from one or more other source code documents 205. In some cases, at least some of the source code documents 205 may include functionality for collecting or otherwise obtaining data from data sources remote from the tenant platform and/or multi-tenant system 16; querying (e.g., accessing and manipulating) database objects (DBOs) from an associated tenant space 112; and/or logging, recording, or otherwise storing information to an associated tenant space 112. Additionally, the source code documents 205 produced by an individual tenant may be written in different programming or scripting languages.

The source code documents 205 may be parsed or otherwise divided into a set of code blocks 210 (shown as code blocks 1 to N in FIG. 2). In some embodiments, the CLE 200 may implement a parser to parse the source code documents 205 into the code blocks 210. The parser may be an application or program code that may process, parse, generate, and transform source code documents 205 into different units of code (e.g., code blocks 210). In some implementations, the parser may be its own software module separate from the other software modules of programs code, where the parser is called by the CLE 200 using a suitable API, middleware, software connector, software glue, etc. In other implementations, the parser may be part of the CLE 200 and solely usable by the CLE 200. As examples, the parser may be the Simple API for XML (SAX); Streaming API for XML (StAX); the Apache® Xerces Native Interface (XNI); Java™ API for JSON Processing, which includes its own JSON based Streaming API; Apex JSONParser class methods for Salesforce.com® based platforms; a proprietary parser application/API; and/or a parser specifically designed for the CLE 200. Additionally, multiple parsers (or multiple parser entities) may be used to parse different types of source code documents 205, for example, a first parser may be used to parse XML documents or source code documents including XML, and a second parser may be used to parse source code documents 205 including SOQL commands. The output of the parser may be a tree structure, object, array, or some other suitable data structure. Once generated, the elements of this data structure may be stored in corresponding records of a database object (DBO) in a cross-tenant learnt database (CTLDB) using a suitable query language, such as any of those discussed herein.

The code blocks 210 may be individual portions of code parsed or otherwise divided from the source code documents 205. For example, a code block 210 may include individual query language elements (e.g., individual fields, records, objects, filters, parameters, expressions, clauses, predicates, queries, statements, etc.), individual programming language elements (e.g., individual expressions, atoms, variables, numbers, symbols, lists, arrays, etc.), individual system calls or callouts (e.g., remote procedure calls (RPCs), API calls, HTTP requests, etc.) and/or event monitoring and/or data logging elements. In embodiments, the code blocks 210 may include queries (e.g., SOQL queries), exceptions (e.g., anomalous or exceptional conditions requiring special processing, which may change the flow of program execution) and/or exception handling, code for data logging (e.g., Asynchronous JavaScript+XML (Ajax) triggers), code for making RPCs (e.g., Ajax calls, REST/SOAP API calls, etc.), code that fulfills tenant-specific logic (e.g., business logic, platform-specific logic, etc.), and/or the like.

In some implementations, the code for data logging and/or tenant-specific logic may comprise one or more Ajax documents with one or more triggers or one or more other web documents including Ajax triggers, which may be parsed into individual code blocks 210. Ajax triggers may be program code that perform specified actions in response to changes to specified database records in a tenant space. A trigger may execute before or after various operations, such as insert, update, delete, merge, upsert, and undelete operations. Triggers to be executed before an operation may be referred to as "before triggers" and triggers to be executed after an operation may be referred to as "after triggers." Triggers can also modify other records of the same type as the records that initially initiated the trigger, and in some cases, the modification of the records may cause other triggers to execute.

The individual code blocks 210 may be passed to a block identifier 215, which may identify a code block type of the code blocks 210. The block identifier 215 may parse the code blocks 210, and may identify different code segments that may be handled differently by a subsequent analysis engine. In this example, the block identifier 215 may identify SOQL blocks 220, exception blocks 230, Ajax call/RPC blocks 240, data logging ("log") blocks 250, and other blocks 260.

In one example, the source code documents 205 may include code Visualforce® and/or Lightning® components. Visualforce® and Lightning® are component-based user interface frameworks for the Force.com® platform that includes a tag-based markup language. Each tag may correspond to a coarse or fine-grained user interface component, such as a section of a web page, application, a field, a graphical control element (GCE), a facet or lens view of data, or the like. These components may include standard components provided by the system 16 or custom components built by individual tenants. In some cases, applications provided by these source code documents 205 may be rendered on one or more app servers 100 (see FIG. 1B), and may be displayed in a web browser of application container of a user system 12, and therefore, such applications may have server-side access to tenant data and tenant/business logic. In other cases, applications provided by these source code documents 205 may use the user system 12 web browser or application container to run JavaScript at the user system 12 and may use Apex at the server-side to provide tenant data and tenant/business logic. In either case, one or more tags in individual source code documents 205 may be parsed into individual code blocks 210, which may be identified according to the particular component of the tag, a tag element, tag attribute, tag value, or using some other criteria, or combination thereof.

Once the blocks 210 are identified, the identified blocks 220-260 may be passed to a corresponding analysis engine. In this example, the SOQL blocks 220 may be passed to a SOQL analysis engine 225, the exception blocks 230 may be passed to an exception analysis engine 235, the Ajax call blocks 240 may be passed to an Ajax/RPC analysis engine 245, the log blocks 250 may be passed to a data logging analysis engine 255, and the other blocks 260 may be passed to other analysis engines 265 or no action may be taken on the other blocks 260 ("STOP"). The operations of the different analysis engines are discussed in more detail with regard to FIGS. 3-5 infra.

Each analysis engine may output performance predictions. The performance predictions may include or indicate one or more actions that are predicted to occur when one or more code blocks 210 are executed; a speed at which a code block 210 will be executed; a speed at which an action specified by a code block 210 is to be performed after execution of that code block 210 is initiated; an amount of resources (computing, storage, network, etc.) that are predicted to be consumed during execution of one or more code blocks 210; and/or other like predictions relevant to execution of the code blocks 210. In the example of FIG. 2, the SOQL analysis engine 225 may output SOQL performance predictions 228 including or indicating query optimizations, the exception analysis engine 235 may output performance predictions 233 including or indicating code improvements or suggestions, the Ajax/RPC analysis engine 245 may output performance predictions 238 including or indicating a security analysis (e.g., indicating trusted or untrusted data sources, a reliability level of one or more data sources, and/or the like), and the data logging analysis engine 255 may output performance predictions 243 including or indicating compliance information logging checks (e.g., whether data to be logged complies with a desired or selected regulatory scheme or standard(s)).

The CLE 200 may then generate consolidated compile time feedback 270, which may be based on one or more of the performance predictions 228, 233, 238, 243. The feedback may be suggestions or recommendations provided to a tenant to improve performance of the source code documents 205 based on determined performance predictions 228, 233, 238, 243. The feedback 270 may then be sent or otherwise provided 275 to a user system 12.

In embodiments, the CLE 200 may include a collaborative learning phase (also referred to as a "logging phase" or "collection phase"), in the collaborative learning phase, the CLE 200 may gather information from all tenants based on their code (e.g., Ajax code), SOQL queries, tenant action/operation logs, error/exception records, and/or other like information. For example, when a tenant receives an exception frequently on a specific workflow and the code is fixed, the system may log the code fix and exception pair as a data point for learning. In another example, a SOQL query and a corresponding execution time, as well as other parameters associated with the SOQL query, may be used as a data point for learning.

In the recommendation phase, the CLE 200 may apply the learnings to new and/or existing code, SOQL queries, etc. For new code, the CLE 200 may provide individual tenants with potential code improvements based on improvements of other tenants and/or query optimizations using the predicted execution times for the queries, which may also be based on query times of queries of other tenants. For existing code, the CLE 200 may provide suggestions about potential fixes to solve unhandled exceptions, and may also provide SOQL optimizations to existing queries using existing or newly discovered optimizations. In alternative embodiments, the code fixes and/or query optimizations may be automatically applied to the tenant code/queries rather than providing suggested changes.

The collaborative learning techniques discussed herein may improve system performance and reduce resource consumption (i.e., overhead). In one example, providing code fix recommendations may reduce the number of compiles that take place and the overall compile time of each tenant application. This may reduce network and computational overhead (for both the user systems and the multi-tenant system). In another example, providing query optimization recommendations may reduce the number of query plan operations for each query provided by the tenants, which may reduce network and computational overhead for both the user systems and the multi-tenant system. In some embodiments, the system cache may be preloaded with objects that may improve the overall performance of the multi-tenant system using the existing learning of usage patterns of the users/workflows.

III. Existing Code Embodiments

Figure 3:
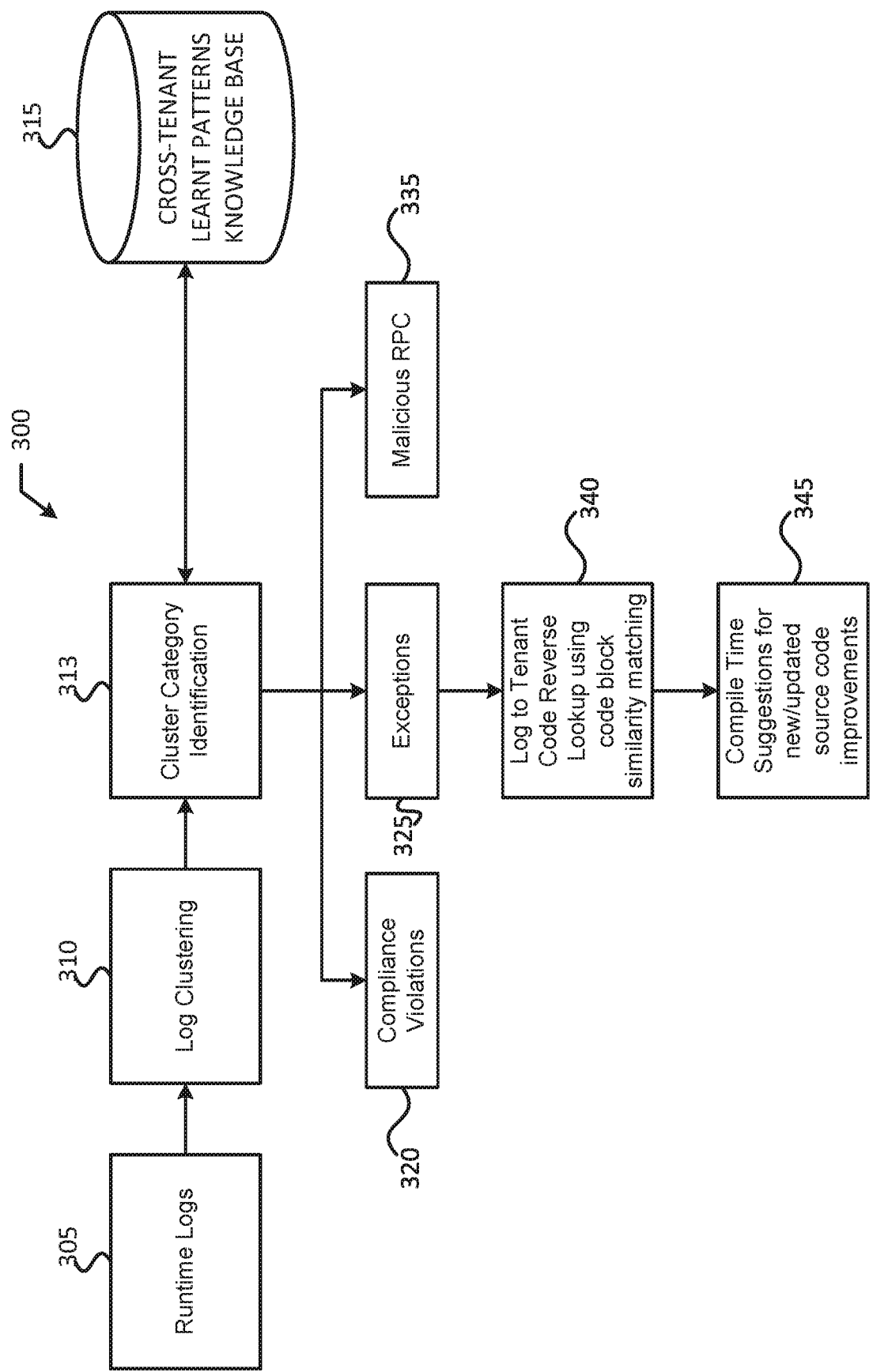
FIG. 3 shows an example existing source code architecture in accordance with various embodiments.

FIG. 3 shows an example existing source code architecture 300 of the multi-tenant collaborative learning architecture of FIG. 2, in accordance with various embodiments. For existing code, the CLE 200 may collect some or all of the runtime logs 305 from some or all of the tenants. In embodiments, the multi-tenant system 16 may record tenant's interactions with the system 16 and may generate the runtime logs 305. The runtime logs (or "logs") 305 may be data structures or documents that include or indicate various operations or actions performed by individual tenants, including interactions with user systems 12 and other remote systems/platforms. The collected logs 305 may be fed to a log cluster engine 310, which may form clusters of similar logs 305, and a cluster identifier 313 may identify a category of each cluster.

The clusters 310 may be a group or set of objects that are more similar to one another than to objects in another cluster, and the cluster categories may be an identified classification or topic associated with each category. The clusters 310 may be categorized according to a cluster model used to aggregate or group the logs 305 into the clusters 310. For example, logs 305 related to compliance violations may be clustered into a compliance violations cluster 320, logs 305 related to exceptions or exception handling may be clustered together in an exceptions cluster 325, and logs 305 related to malicious RPCs may be clustered together in a malicious RPC cluster 335. The cluster engine 310 may cluster the logs 305 into a multitude of different cluster types, such as clusters related to generating or editing XML or JSON documents, or any other suitable cluster.

Once the clusters are created, a cluster category of each cluster may be identified 313. After the clusters are identified, the CLE 200 may perform a reverse lookup operation 340 to identify tenant identifiers (IDs) from which the source code 205 originated and to identify specific locations within the source code documents 205 related to the identified clusters 313. The reverse lookup operation may be used to find where a particular log 305 and/or code block originated or is stored. After the reverse lookup, the identified clusters 313 may be stored in a cross-tenant learnt database (CTLDB) 315 in association with the tenant ID and/or the location within the source code document 205. The stored clusters may be used for refining future code fixes/optimizations. Next, the CLE 200 may provide 345 code fixes or optimizations to the identified tenants at the identified locations within the source code documents.

In a first example, the runtime logs 305 may indicate a runtime exception for a certain source code document 205 or code block 210 and a code fix that actually resolved the runtime exception. In this example, the CTLDB 315 may store a database object (DBO) of the code fix along with the exception that it was causing (e.g., as a tuple, an attribute value pair, key-value pair, etc.). In some embodiments, this DBO may be stored in association (e.g., a "relationship") with a tenant ID of the tenant that provided the code fix and/or a source code location ID of the certain source code document 205 or code block 210. The code fix may then be recommended to other tenants who are also facing the same exceptions as feedback 345.

In a second example, the runtime logs 305 may indicate a particular query that is typically used by multiple tenants, as well as a query execution time (e.g., an amount of time from initiating execution of the query and receiving an output). Additionally, some of the runtime logs 305 may indicate a code change made by one tenant that resulted in a shorted query execution time. In this example, the CTLDB 315 may store a DBO of the query along with the code change that resulted in the shorter query execution time (e.g., as a tuple, an attribute value pair, key-value pair, etc.). In some embodiments, this DBO may be stored in association (e.g., a "relationship") with a tenant ID of the tenant that provided the code fix and/or a source code location ID of the certain source code document 205 or code block 210. In some implementations, the CTLDB 315 may store other information associated with this query optimization, such as a query profile, a query tree of the query (e.g., produced by a query optimizer of the system 16), optimizer statistics, and/or other like information. A query profile may include statistics for one or more query statements including database objects, fields, and/or records referenced by the query statements. The optimizer statistics may include DBO statistics indicating table access costs, cardinality, etc.; index statistics indicative of whether to perform index scans or full table scans; system statistics such as processor, memory, network, and I/O performance; and column statistics such as number of column values, number of nulls, etc. The optimized query, or a path for reaching the optimized query, may then be recommended to other tenants who include or use similar queries as feedback 345.

IV. Analysis Engine Embodiments for New Code

As discussed previously, the CLE 200 may include multiple analysis engines to identify and provide different compile time suggestions for new or updated source code. For example, the CLE may include a SOQL analysis engine 225 to analyze source code and provide DB query optimizations, an exceptions analysis engine 235 to analyze source code and provide suggested modifications to avoid exceptions, an Ajax/RPC analysis engine 245 to analyze source code and provide optimized (or trusted) RPCs, and a data logging analysis engine 255 to analyze source code to identify whether the code would lead to non-compliance issues.

Figure 4:
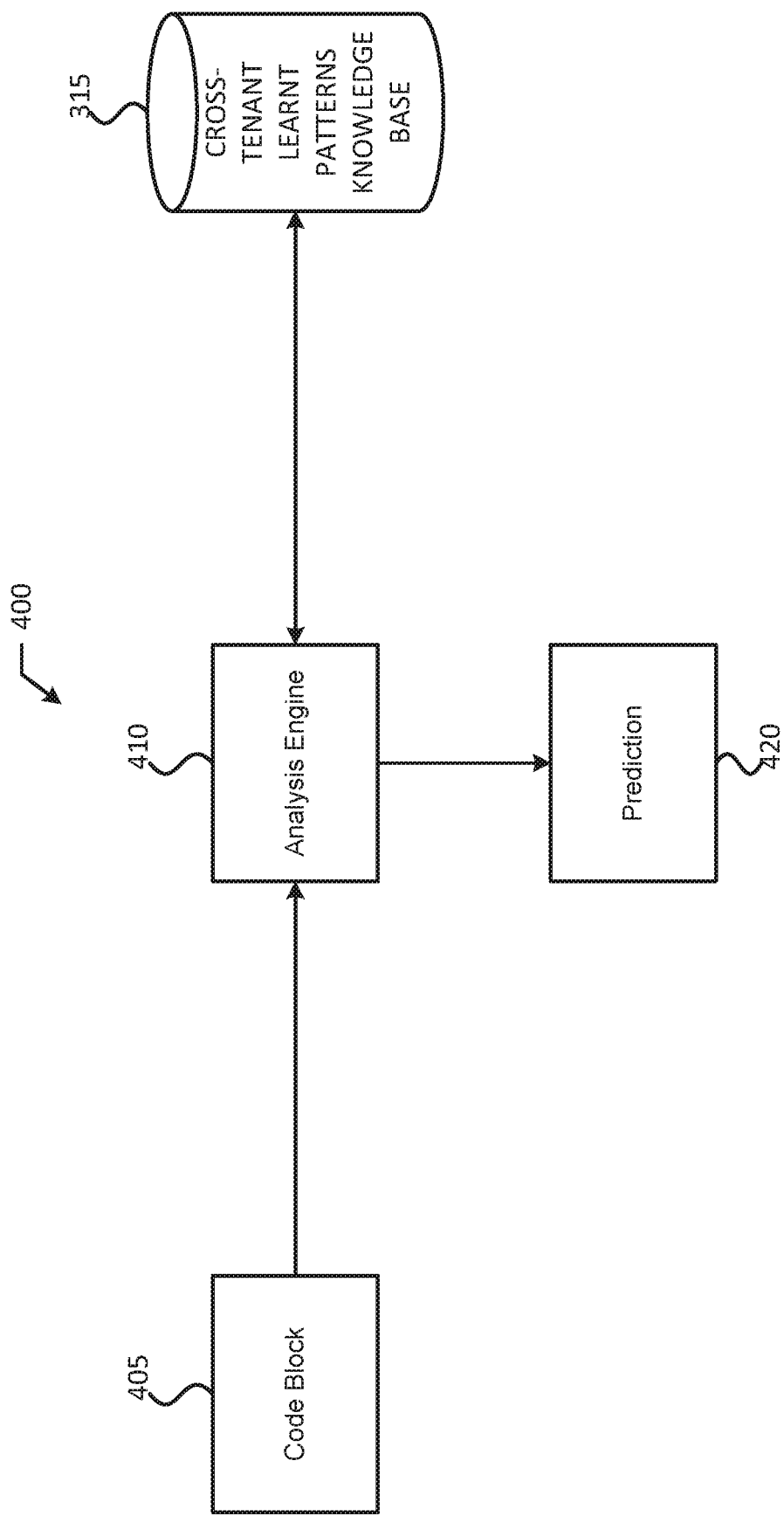
FIG. 4 shows an example analysis engine architecture in accordance with various embodiments.

FIG. 4 shows an example analysis engine architecture 400 in accordance with various embodiments. In this example, an extracted code block 405, which may correspond to a code block 210 of FIG. 2, may be provided to the analysis engine 410. Additionally, information from the CTLDB 315 may be fed into or otherwise provided to the analysis engine 410. The analysis engine 410 may correspond to the exceptions analysis engine 235, the Ajax/RPC analysis engine 245, and the data logging analysis engine 255 of the multi-tenant collaborative learning architecture of FIG. 2. The analysis engine 410 may then determine a prediction 420 based on the code block 405 and the information obtained from the CTLDB 315. The particular algorithms, procedures, processes, etc. used may be based on the type of code block 405 that is to be analyzed.

When the analysis engine 410 corresponds with the logging analysis engine 255, the analysis engine 410 may obtain code blocks 405 and review relevant records in the CTLDB 315 to determine if the code blocks 405 include any information or data, or would log any information/data, that is similar to information/data found to be noncompliant with desired or selected regulations or standards. The analysis engine 410 may then generate predictions 420 to indicate the potentially noncompliant information/data or code that may potentially log noncompliant information/data.

In a first example, if a customer has signed up for, or otherwise operates a platform that is required to comply with the Health Insurance Portability and Accountability Act (HIPAA), the logging analysis engine 255 may identify code blocks 405 that include patient identifying information or medical record(s), or program code in the blocks 405 that is/are likely to cause patient data or medical records to be logged to the tenant space 112. In a second example, a tenant may operate a media sharing platform and the logging analysis engine 255 may identify code blocks 405 that do not provide a mechanism to log takedown notices for compliance with the Digital Millennium Copyright Act (DMCA) (see e.g., 17 U.S.C. § 512(c)-(d)). In both of these examples, the logging analysis engine 255 may identify the noncompliant information/code based on similar types of code and/or information stored in the CTLDB 315, and the identified information or code may be included or indicated by the predictions 420.

In some embodiments, the logging analysis engine 255 may notify the tenant to which the code blocks 405 belong of any information/code that has been found to be noncompliant shortly after the compile time, such as by presenting the tenant/developer with a list of each potentially noncompliant information item (e.g., as the predictions 420 and/or compliance information 243 to be included in feedback 270). In other embodiments, the logging analysis engine 255 may issue a warning during compile time to indicate individual pieces of information that may be noncompliant, for example, by presenting a pop-up element in a code editor of a development environment (e.g., as the predictions 420 and/or compliance information 243 to be included in feedback 270). In other embodiments, the logging analysis engine 255 may provide a suggested filter or other mechanism (e.g., create a master object for a master-detail relationship, lookup filters, etc.) that may allow the code blocks 405 to comply with the relevant regulation/standard.

When the analysis engine 410 corresponds with the RPC/Ajax analysis engine 245, the RPC/Ajax analysis engine 245 may identify code within the code blocks 405 that may make a remote procedure call (RPC) or Ajax call to some other system, and may determine whether the entity or system that the tenant is trying to contact is a trustworthy source or not based on information in the CTLDB 315. During compile time, the RPC analysis engine 245 may notify the tenant that it may be contacting an untrustworthy entity (e.g., by including the predictions 420 in the feedback 270). The predictions 420 provided by the RPC analysis engine 245 may indicate, for example, that some data from a particular external source is untrustworthy; that the particular external source probably does not have reliable information; and/or that another external source may have more reliable information that is the same or similar to the information sought by the tenant. For example, a first tenant may have indicated in their code 205 that particular external sources are untrustworthy (e.g., though some sort of black list, configuration, or the like), and the RPC analysis engine 245 may use this information, which may be stored in the CTLDB 315, to warn other tenants of the untrustworthy source.

When the analysis engine 410 corresponds with the exceptions analysis engine 235, the exceptions analysis engine 235 may identify code blocks 405 that experience runtime exceptions or have compile time errors, and may identify learnt code of other tenants that have resolved those exceptions/errors. This information may be stored in the CTLDB 315 in a same or similar manner as discussed previously. As an example, the runtime logs 305 may have recorded multiple tenants that are receiving the same runtime exception or error during code execution, and one of the tenants may have implemented a code fix that makes that particular runtime exception or error disappear for that tenant. In this example, during the collaborative learning phase the exceptions engine 235 may identify the code fix that actually resolved the runtime exception or error, and may store a DBO of the code fix along with the exception or error that it was causing (e.g., as a tuple, an attribute value pair, or the like) in the CTLDB 315. The exception analysis engine 235 may then generate predictions 420 to indicate or include the code fix, which may then be included in feedback 270 that is provided to other tenants who are also facing the same exceptions or errors.

To determine the appropriate code fix to recommend, the exceptions analysis engine 235 may generate a semantic tree of the identified code block 210/405 and a semantic tree of another similar code block of another tenant from the CTLDB 315. In embodiments, the exceptions analysis engine 235 may implement a parser (not shown) or other like program code that may analyze strings, symbols, characters, variables, functions, etc. of source code documents 205 and/or code blocks 505 according to a syntactical or semantic configuration, and may generate a representative data structure based on the analysis. The output of such a parser may be a semantic tree, a syntax tree, a parse tree, a sequence tree, or other like tree structure. The tree/data structure may represent logical steps used to execute a query.

Once the semantic trees for both code blocks have been generated, the exceptions analysis engine 235 may then compare each of the semantic trees based on a distance or different between the semantic trees. In embodiments, the distance or difference may be a bit distance or Euclidean distance between nodes in each semantic tree.

When the semantic trees are similar or analogous to one another, the exceptions analysis engine 235 may provide predictions 420 as a suggestion or recommendation. In embodiments, the similarity between trees may be based on a threshold number of nodes in the semantic trees that match one another, although other methods for determining similarity may be used in other embodiments. For example, when a first semantic tree is organized in a different from a second semantic tree, meaning the first code block is organized as XYZ and the second code block is organized as XZY, then the exceptions analysis engine 235 may provide predictions 420 as "This portion of code may throw an X-type exception . . . organizing this portion of code as "XYZ" may avoid throwing the X-type exception." The particular sentence to be provided to a tenant as the feedback may be constructed around the determined bit or Euclidean distance.

When the semantic tress are not considered similar or analogous, the exceptions analysis engine 235 may determine a path to get to the working code that has already been recorded by other tenants. The path to arrive at the working code may be a sequence of nodes, starting with the code block 210 or the working code (e.g., as a "root" node), and edges connecting each node with one or more descendant nodes, where an edge may be a connection between a node and another node and a node may be a structure that contains a value, condition, variable, or may represent a separate data structure. The distance between the semantic trees may be a shortest sequence of nodes and edges from one semantic tree to another semantic tree. In embodiments, the exceptions analysis engine 235 may apply one or more code construction models or algorithms to the semantic tree (e.g., obtained from the previously discussed parser) and the statistics to determine a path that a tenant may undertake in order to arrive at a working version of the tenant code. The code construction models may be based on the analysis of the runtime logs 305 discussed previously with regard to the FIG. 3. In some embodiments, a suitable tree distance algorithm may be used, such as, bit distance, Euclidean distance, Hamming distance, Levenshtein distance, tree edit distance, string edit distance, Klein's tree distance algorithm, Zhang and Shasha's Algorithm, or some other suitable algorithm, or combinations thereof.

The optimal path to arrive at working code may be referred to as a "code construction plan," "code plan," or the like. Furthermore, the decisions made by the exceptions analysis engine 235 may be based on a calculation of costs for executing the working version of the code in terms of required processor resources, memory utilization, I/O operations, network resources, and the like. In such embodiments, the exceptions analysis engine 235 may generate and evaluate multiple code construction plans and may choose a lowest-cost plan, which may be a code construction plan that results in working code that executes faster than other code with similar functionality, working code that uses the least amount of resources compared to resources used by other similar code, and/or working code that uses the lowest amount of iterations as possible (e.g., spending the least amount of time within the processor system 17). The various decisions made by the exceptions analysis engine 235 may be referred to as "code construction plan functions", "code construction plan procedures", and the like.

Figure 5:
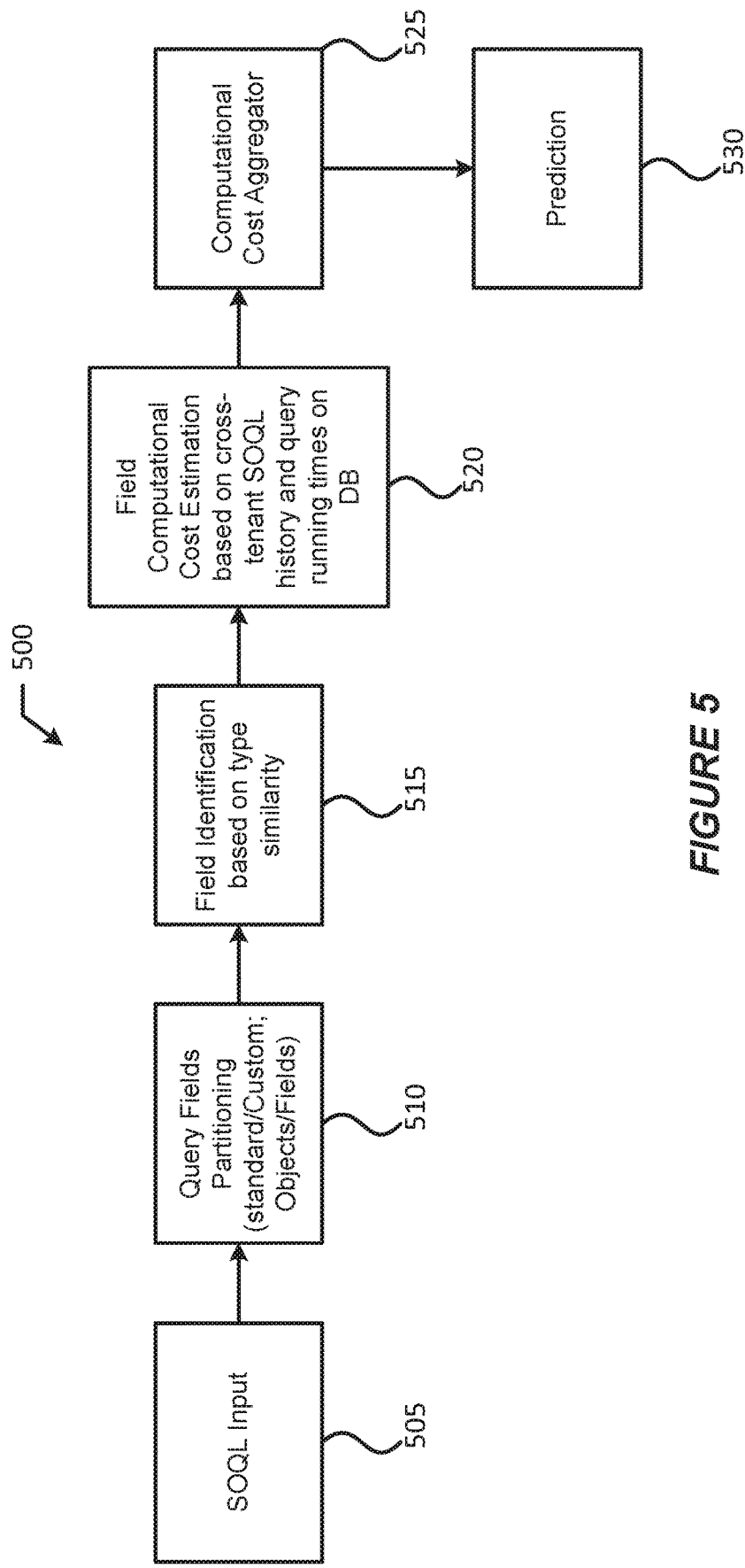
FIG. 5 shows an example query analysis engine in accordance with various embodiments.

FIG. 5 shows an example SOQL analysis engine 225 of the multi-tenant collaborative learning architecture of FIG. 2, in accordance with various embodiments. The SOQL analysis engine 225 may obtain a SOQL code as an input 505, and may partition 510 the various query parameters of the SOQL code into different blocks, such as standard fields ordered by filter X, custom fields related to parameter Y, etc. After partitioning the query parameters, the SOQL analysis engine 225 may identify 515 the individual fields based on type similarity.

The SOQL analysis engine 225 may then calculate the costs, in terms of resource consumption, execution speed, and/or the like, for running the SOQL query 520 based on information obtained from the CTLDB 315, as well as tenant performance metrics and tenant information (e.g., tenant size, etc.). In embodiments, the SOQL analysis engine 225 may predict the execution/resource consumptions costs for individual query elements (fields, records, parameters, etc.) using query profile information, optimizer statistics, query runtimes, etc. of similar queries that are stored in the CTLDB 315. The query profile information, optimizer statistics, query runtime information, etc. of various queries may be referred to as "tenant query history data," "SOQL history," and the like. In some embodiments, the SOQL analysis engine 225 may generate a query path or query tree to determine the costs of the executing the SOQL query. In embodiments, the cost for executing each field may be computed 520, and the SOQL analysis engine 225 may then implement a computational cost aggregator 525 to aggregate the execution costs for each field.

The SOQL analysis engine 225 may generate predictions 530, which may include or indicate the aggregated cost for executing the SOQL query. The predictions 530 may be provided to the CLE 200 (see FIG. 2) and included in the feedback 270, which may then be provided 275 to the tenant developer. In some embodiments, the predictions 530 may include suggested query parameters that may optimize the SOQL code so that the query may run faster and/or consume less resources.

V. Example Procedures

FIGS. 6-11 illustrate various processes for practicing the example embodiments discussed herein. For illustrative purposes, the operations of the processes of FIGS. 6-11 are described as being performed by elements/components/devices shown and described with regard to FIGS. 1A-5; however, other computing devices/systems may operate the depicted processes in a multitude of implementations, arrangements, and/or environments. In various implementations, the processes may be embodied as program code stored in a memory system, which when executed by a processing device or a processor system of a computer device/system (e.g., processor system 17 of system 16), may cause the computer device/system to perform the various operations of such processes. In such implementations, one or more general purpose processing device(s) may be transformed into a special purpose processing device(s) configured to perform any of operations described herein responsive to accessing the program code of processes 600-1100 of FIGS. 6-11, respectively, from an electronic memory or computer-readable media. While particular examples and orders of operations are illustrated in FIGS. 6-11, in various embodiments, these operations may be re-ordered, separated into additional operations, combined, or omitted altogether.

Figure 6:
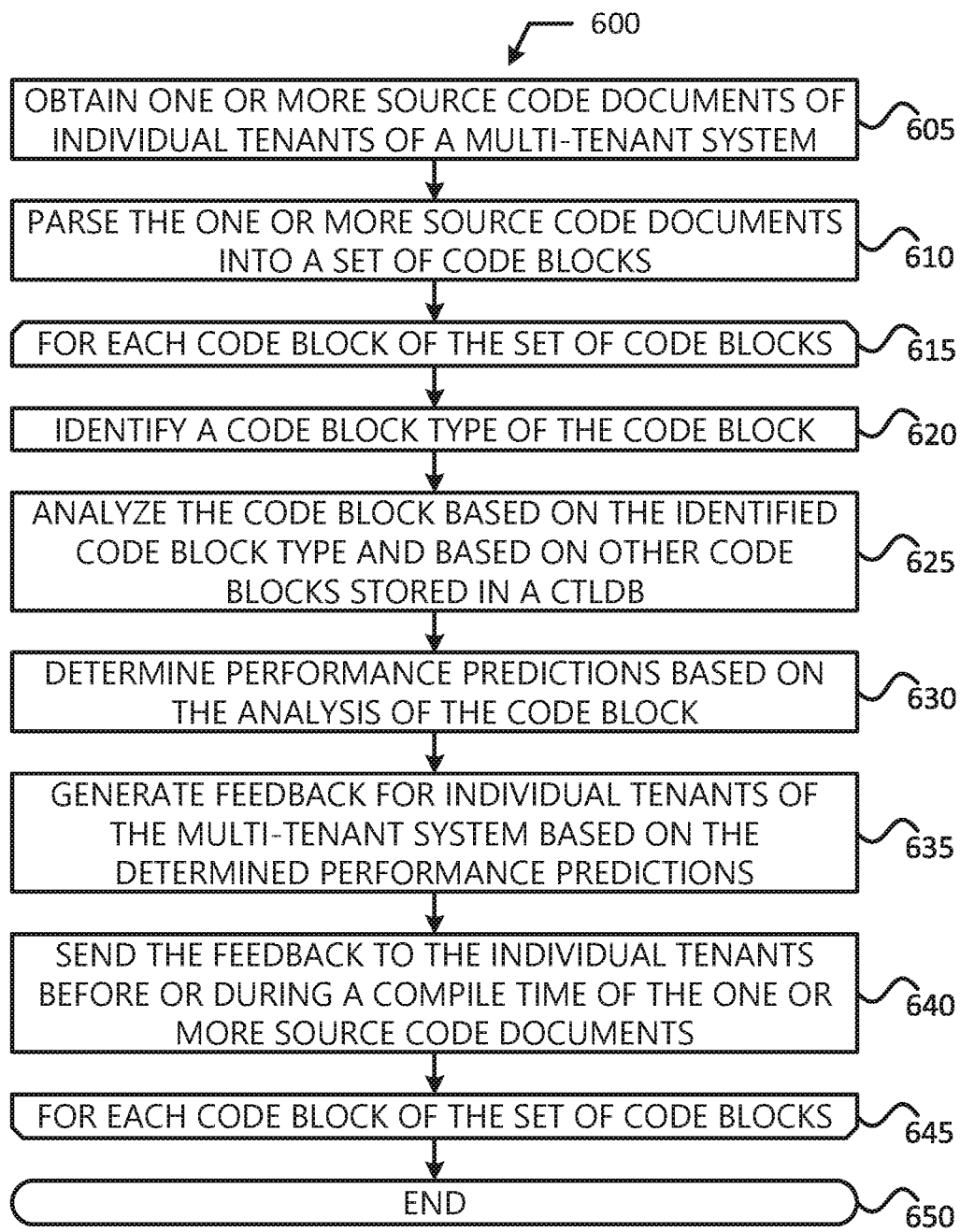
FIG. 6 illustrates an example multi-tenant collaborative learning process in accordance with various embodiments.

FIG. 6 illustrates an example multi-tenant collaborative learning process 600 in accordance with various embodiments. Process 600 may begin at operation 605 where a processor system 17 may obtain one or more source code documents 210 produced by individual tenants of the multi-tenant system 16. In embodiments, the one or more source code documents 210 may be obtained from respective tenant spaces 112 and/or application metadata spaces 116 of the tenant data storage 22 (see FIGS. 1A and 1B). In embodiments, the one or more source code documents 210 may be obtained from a code editor of an IDE provided by the system 16, the application platform 18, or the process space 28 (see FIGS. 1A and 1B). At operation 610, the processor system 17 may parse the one or more source code documents 210 into a set of code blocks 210.

At operation 615, the processor system 17 may process each code block 210 of the set of code blocks 210, in turn, and may proceed to perform operations 620-640 for each code block 210. At operation 620, the processor system 17 may identify a code block type of the code block 210. At operation 625, the processor system 17 may analyze the code block 210 based on the identified code block type and based on other code blocks 210 of the identified code block type that are stored in a cross tenant learnt database (CTLDB). At operation 630, the processor system 17 may determine performance predictions based on the analysis of the code block 210. At operation 635, the processor system 17 may generate feedback 270 for individual tenants of the multi-tenant system based on the determined performance predictions and based on the code blocks 210 produced by other tenants of the multi-tenant system 16. In various embodiments, the processor 17 may operate an individual analysis engine corresponding to the identified code block type (e.g., SOQL analysis engine 225, exception engine 235, RPC analysis engine 245, or information logging analysis engine 255 of FIG. 2) to perform operations 630-635.

At operation 640, the processor system 17 may control the network interface 20 to send the generated feedback 270 to a tenant to which the code block 210 belongs. The processor system 17 may then proceed to closing loop operation 645 where the processor system 17 may process a next code bock 210 of the set of code blocks 210, if any, and may perform operations 620-640 as discussed previously. If there are no remaining code blocks 210 to process at operation 645, the processor system 17 may proceed to operation 650 to end process 600 or the processor system 17 may repeat process 600 as necessary.

Figure 7:
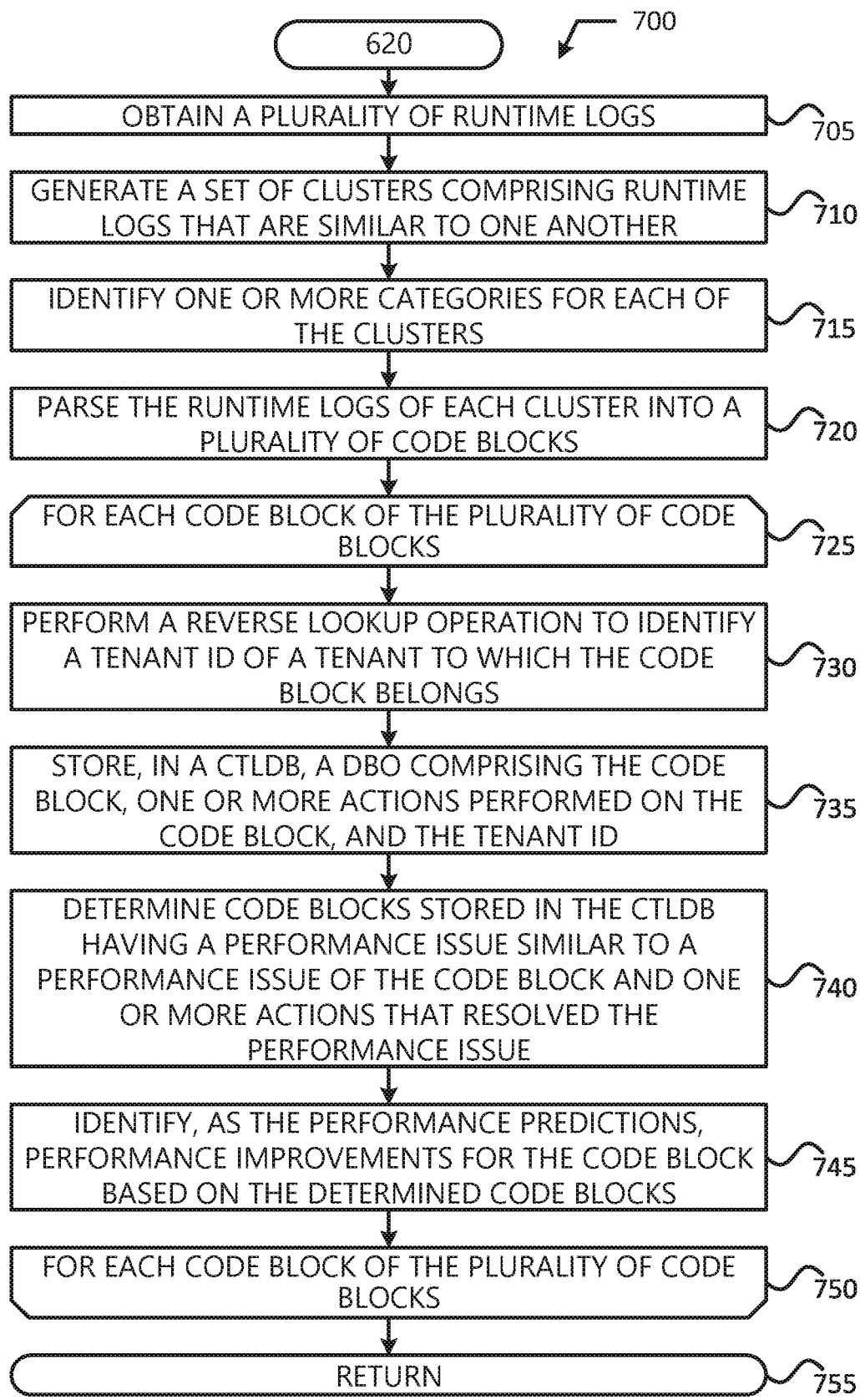
FIG. 7 illustrates an existing source code cross-tenant learning (CTL) process, in accordance with various embodiments.

FIG. 7 illustrates an existing source code cross-tenant learning (CTL) process 700, in accordance with various embodiments. Process 700 may be performed as or after operation 620 of process 600 when a code block 210 or the source code documents 205 are identified to comprise existing code, such as source code documents 205 obtained from respective tenant spaces 112 and/or application metadata spaces 116 of the tenant data storage 22 (see e.g., FIGS. 1A and 1B).

Process 700 may begin at operation 705 where the processor system 17 may obtain a plurality of runtime logs 305. At operation 710, the processor system 17 may generate a set of clusters 310 comprising runtime logs 305 that are similar to one another. At operation 715, the processor system 17 may identify one or more categories 313 for each of the clusters 310. At operation 720, the processor system 17 may parse the runtime logs 305 of each cluster 310 into a plurality of code blocks 210.

At operation 725, the processor system 17 may process each code block of the plurality of code blocks 210, in turn, and may proceed to perform operations 730-745 for each code block 210. At operation 730, the processor system 17 may perform a reverse lookup operation 340 to identify a tenant_id of a tenant to which the code block 210 belongs. At operation 735, the processor system 17 may generate and store a DBO in the CTLDB, where the DBO comprises the code block 210, one or more actions performed on the code block by the tenant, and the tenant_id. At operation 740, the processor system 17 may determine code blocks 210 stored in the CTLDB 315 having a same or similar performance issues of the code block 210 and one or more actions that resolved the performance issue. At operation 745, the processor system 17 may identify, as the performance predictions, performance improvements for the code block 210 based on the other code block 210. The processor system 17 may then proceed to closing loop operation 750 where the processor system 17 may process a next code block of the plurality of code blocks 210, if any, and may perform operations 725-745 as discussed previously. If there are no remaining code blocks 210 to process at operation 725, the processor system 17 may proceed to operation 755 to return to process 600.

Figure 8:
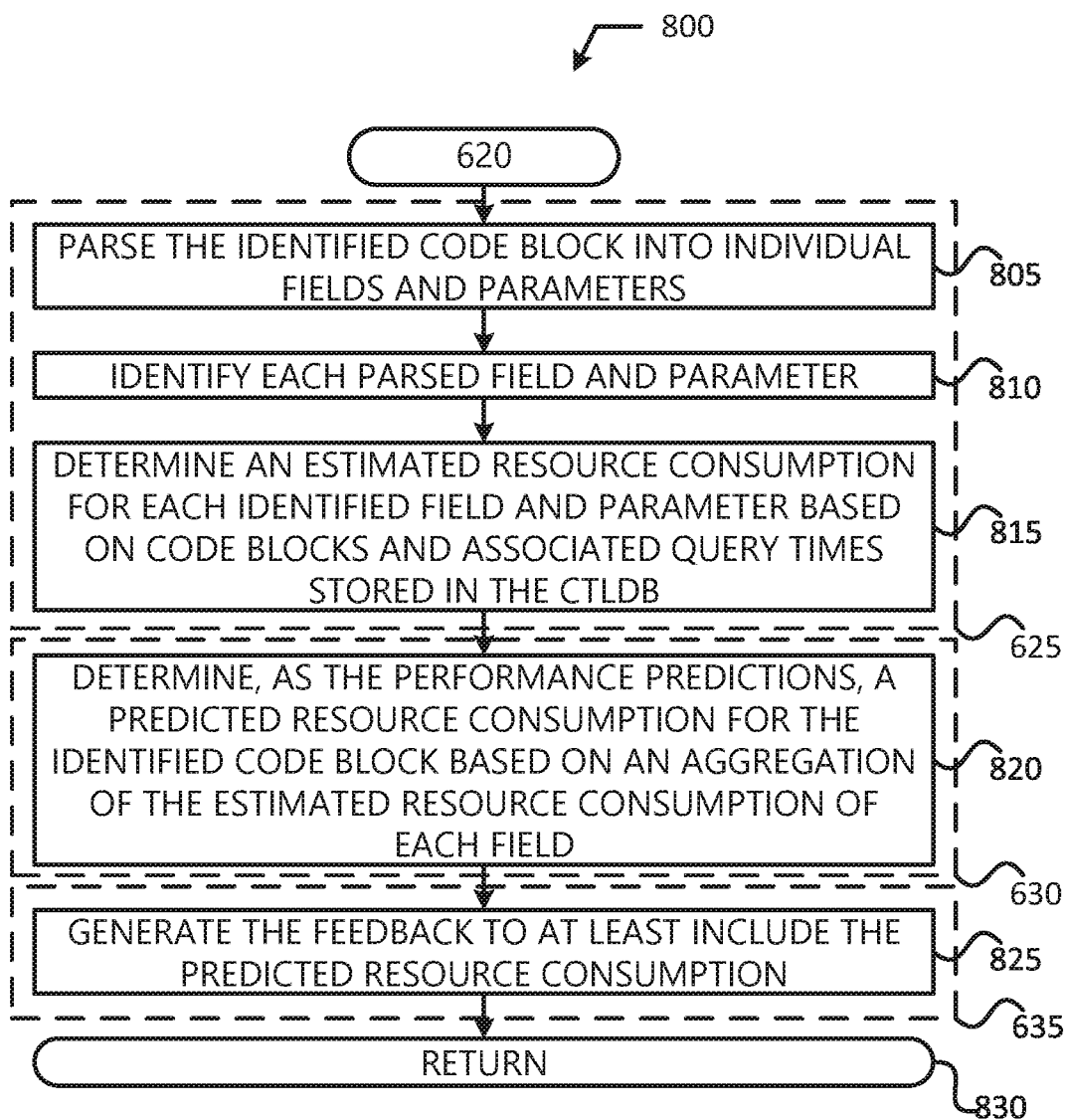
FIG. 8 illustrates a query code CTL process, in accordance with various embodiments.

FIG. 8 illustrates a query code CTL process 800, in accordance with various embodiments. Process 800 may be performed after operation 620 process 600 when the code block 210 being processed are identified to include query code. Process 800 may begin at operation 805 where the processor system 17 may parse the identified code block into individual fields and query parameters. At operation 810, the processor system 17 may identify each parsed field and/or query parameter. At operation 815, the processor system 17 may determine an estimated resource consumption for each identified field and/or query parameter based on code blocks and their associated with query times stored in the CTLDB Operations 805-815 may correspond to operation 625 of process 600.

At operation 820, the processor system 17 may determine, as the performance predictions, a predicted resource consumption for the identified code block based on an aggregation of the estimated resource consumption of each field and/or query parameter. Operation 820 may correspond to operation 630 of process 600. At operation 825, the processor system 17 may generate the feedback to at least include the predicted resource consumption. Operation 825 may correspond to operation 635 of process 600. After perforating operation 825, the processor system 17 may proceed to operation 830 to return to process 600.

Figure 9:
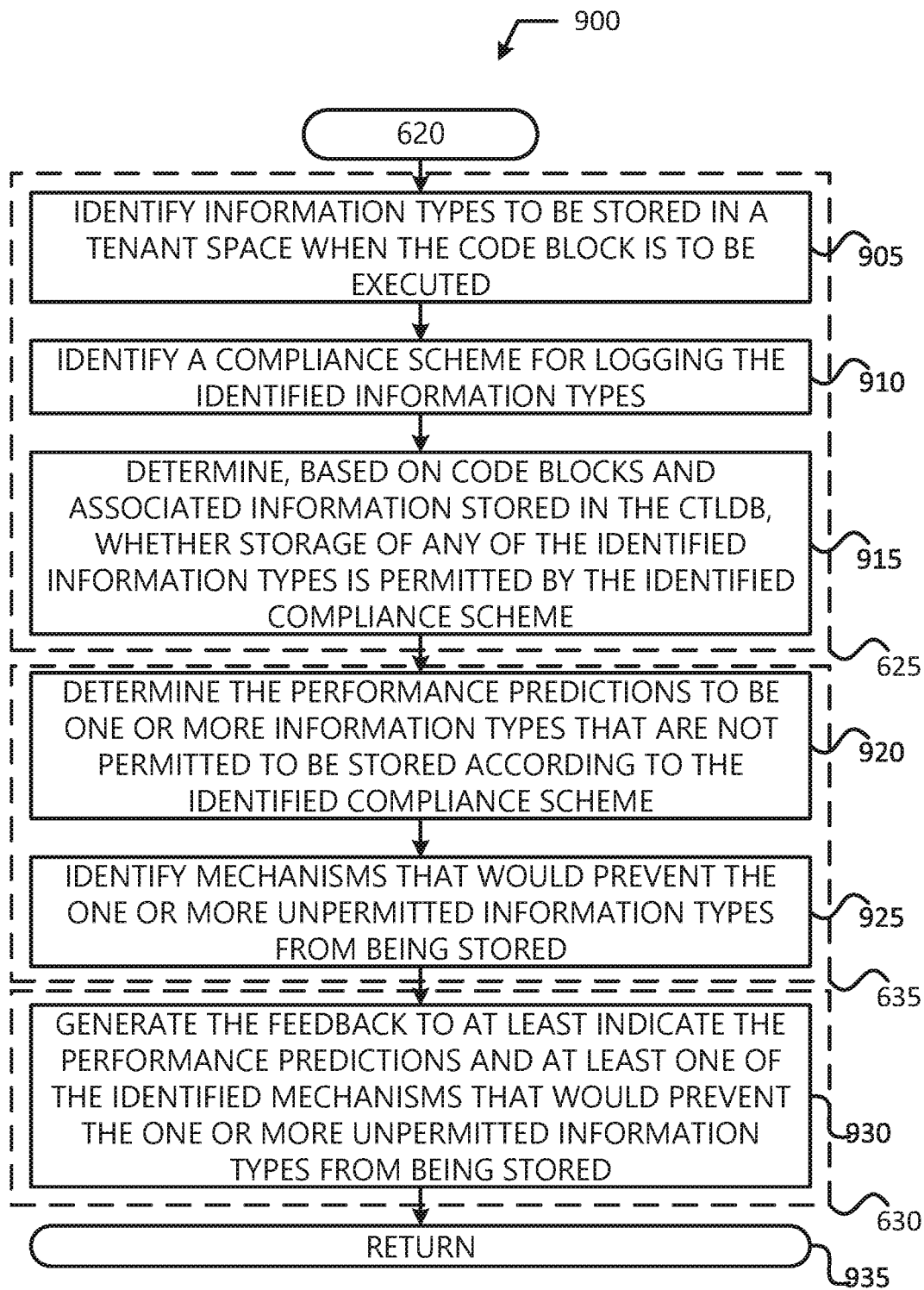
FIG. 9 illustrates a data logging CTL process, in accordance with various embodiments.

FIG. 9 illustrates a data logging CTL process 900, in accordance with various embodiments. Process 900 may be performed after operation 620 process 600 when the code block 210 being processed is identified to include code for logging information and/or is associated with a compliance and/or regulatory scheme. Process 900 may begin at operation 905 where the processor system 17 may identify information types to be stored in a tenant space 112 when the code block is to be executed. At operation 910, the processor system 17 may identify a compliance or regulatory scheme for logging the identified information types. At operation 915, the processor system 17 may determine, based on code blocks and associated information stored in the CTLDB, whether storage of any of the identified information types is permitted by the identified compliance/regulatory scheme. Operations 905-915 may correspond with operation 625 of process 600.

At operation 920, the processor system 17 may determine the performance predictions to be one or more information types that are not permitted to be stored according to the identified compliance/regulatory scheme. At operation 925, the processor system 17 may identify mechanisms that would potentially prevent or limit the one or more unpermitted information types from being stored in the tenant space 112. Operations 920-925 may correspond with operation 630 of process 600.

At operation 930, the processor system 17 may generate the feedback 270 to indicate the performance predictions and at least one of the identified mechanisms that would potential prevent or limit the one or more unpermitted information types from being stored in the tenant space 112. Operation 930 may correspond with operation 635 of process 600. After performing operation 930, the processor system 17 may proceed to operation 935 to return to process 600.

Figure 10:
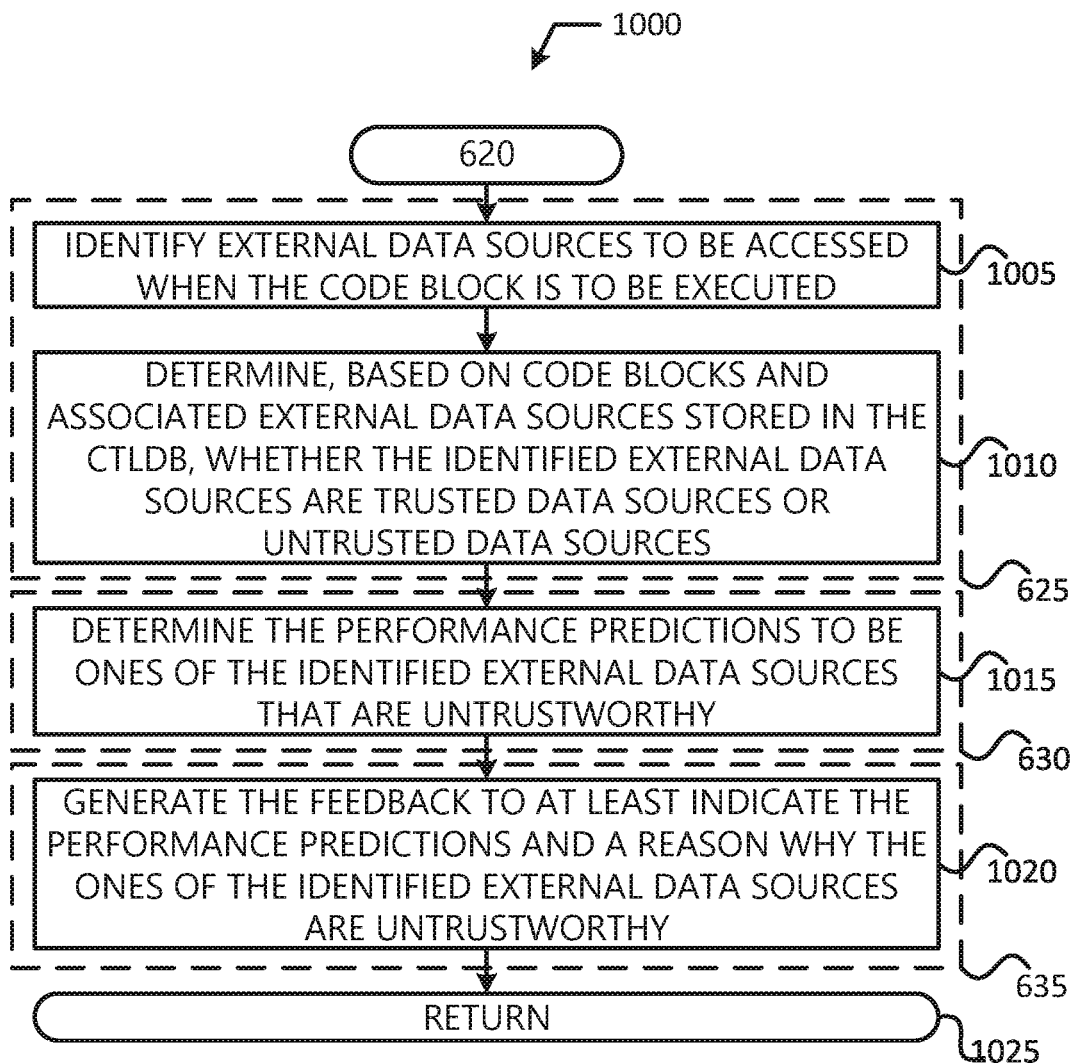
FIG. 10 illustrates a data access CTL process, in accordance with various embodiments.

FIG. 10 illustrates a data access CTL process 1000, in accordance with various embodiments. Process 1000 may be performed after operation 620 process 600 when the code block 210 being processed is identified to include a remote procedure call (RPC) or code for accessing data from a remote data source. Process 1000 may begin at operation 1005 where the processor system 17 may identify one or more external data sources to be access when the code block is to be executed. At operation 1010, the processor system 17 may determine, based on code blocks and associated external data sources stored in the CTLDB, whether the identified external data sources are trusted or untrusted data sources. Operations 1005-1010 may correspond with operation 625 of process 600.

At operation 1015, the processor system 17 may determine the performance predictions to be any of the identified external data sources that are untrustworthy. Operation 1015 may correspond with operation 630 of process 600.

At operation 1020, the processor system 17 may generate the feedback 270 to at least indicate the performance predictions and a reason why the untrustworthy data sources are untrustworthy. In some embodiments, the feedback 270 may be generated to indicate trustworthy data sources that may include similar data that the tenant would like to access. Operation 1020 may correspond with operation 635 of process 600. After performing operation 1020, the processor system 17 may proceed to operation 1025 to return to process 600.

Figure 11:
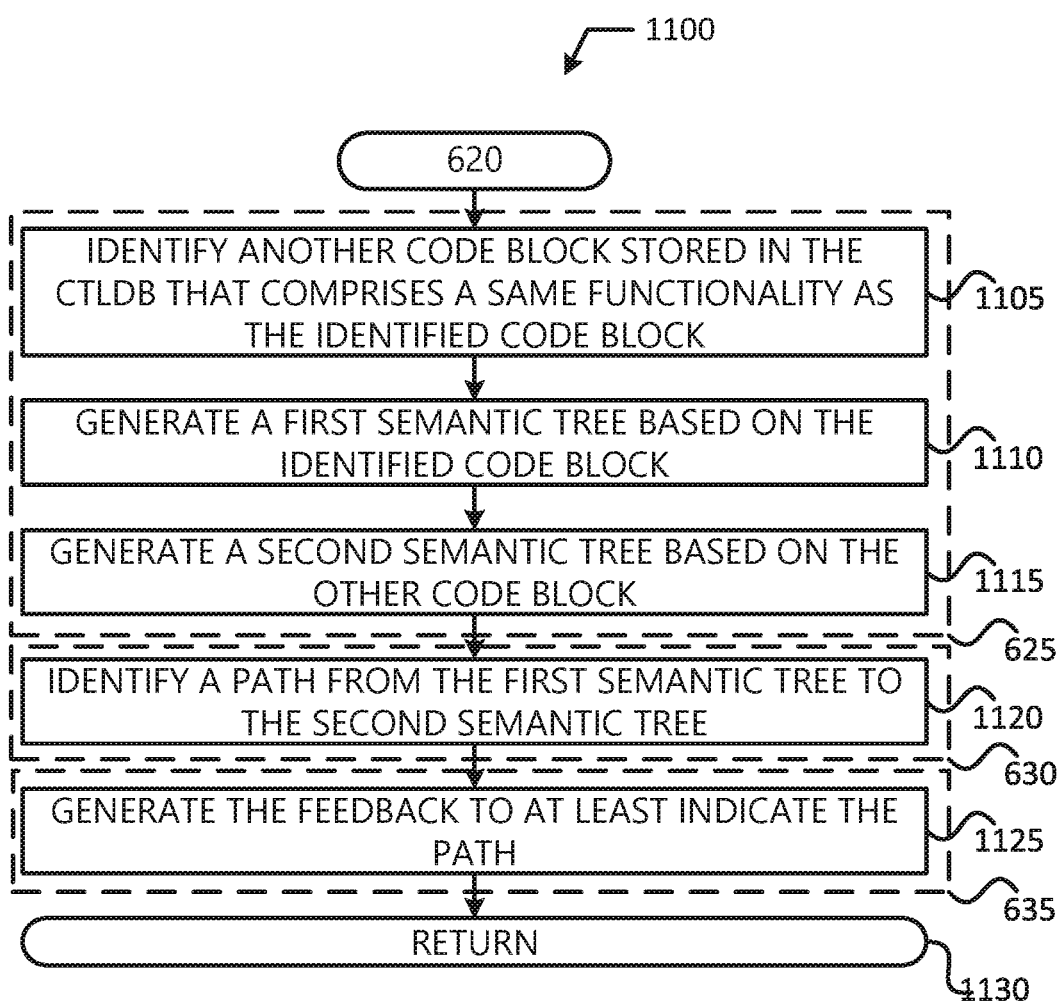
FIG. 11 illustrates code exception CTL process, in accordance with various embodiments.

FIG. 11 illustrates code exception CTL process 1100, in accordance with various embodiments. Process 1100 may be performed after operation 620 process 600 when the code block 210 being processed is identified to include code that will likely throw an exception or cause errors upon execution of that code block 210. Process 1100 may begin at operation 1105 where the processor system 17 may identify another code block stored in the CTLDB 315 that comprises a same or similar functionality as the identified code block 210. At operation 1110, the processor system 17 may generate a first semantic tree based on the identified code block 210, and at operation 1115 the processor system 17 may generate a second semantic tree based on the other code block. In embodiments, operations 1105-1115 may correspond with operation 625 of process 600.

At operation 1120, the processor system 17 may identify a path from the first semantic tree to the second semantic tree. In embodiments, the processor system 17 may calculate an Euclidean distance or bit distance between the first and second semantic trees to determine the path. In embodiments, operation 1120 may correspond with operation 630 of process 600. At operation 1125, the processor system 17 may venerate the feedback to at least indicate the path identified at operation 1125. In embodiments, operation 1125 may correspond with operation 635 of process 600. After performing operation 1125, the processor system 17 may proceed to operation 1130 to return to process 600.

The specific details of the specific aspects of implementations disclosed herein may be combined in any suitable manner without departing from the spirit and scope of the disclosed implementations. Elements and features discussed in any of the previously discussed example embodiments may be used anywhere in one or more other embodiments unless explicitly stated otherwise. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM, and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. As an example, one or more general purpose processing device(s) may be transformed into a special purpose processor configured to perform any of operations described herein responsive to accessing instructions stored in an electronic memory or computer-readable media. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable storage media (NTCRSM) comprising instructions for collaborative learning among a plurality of tenants in a multi-tenant system, wherein execution of the instructions by one or more processors is to cause a computing system to:
generate a plurality of analysis engines that correspond to respective ones of a plurality of code block types, the plurality of code block types including a query language code block, a data logging code block, a system call or callout code block, and an exception code block;
parse one or more source code documents into a set of code blocks, the one or more source code documents being developed for a tenant platform of a tenant of the plurality of tenants; and
for each code block of the set of code blocks:
identify a code block type of the code block from among the plurality of code block types,
select, from among the plurality of analysis engines, an analysis engine that corresponds to the identified code block type,
operate the selected analysis engine to:
analyze the code block based on other code blocks stored in a cross-tenant learnt database (CTLDB) and runtime logs in the CTLDB associated with the other code blocks, the other code blocks being developed for or by other tenant platforms belonging to other tenants of the plurality of tenants, and the runtime logs indicate operations or actions performed by the other tenants when developing the other source code, and
determine performance predictions for the code block based on the analysis of the code block,
generate a consolidated feedback based on the determined performance predictions for each respective code block, and
provide the consolidated feedback to the tenant before or during a compile time of the one or more source code documents.

2. The one or more NTCRSM of claim 1, wherein, when the one or more source code documents comprise existing source code, the set of instructions is operable to:
obtain a plurality of runtime logs, each of the plurality of runtime logs indicating actions performed by individual tenants of the plurality of tenants on the one or more source code documents and results of the performed actions;
generate a set of clusters, each cluster of the set of clusters comprising runtime logs of the plurality of runtime logs that are similar to one another; and
identify categories associated with each cluster.

3. The one or more NTCRSM of claim 2, wherein the set of instructions is operable to:
parse the runtime logs of each cluster into a plurality of code blocks;
perform, for each code block of the plurality of code blocks, a reverse lookup operation to identify a tenant identifier (ID) of a tenant to which the code block belongs; and
store a plurality of database objects (DBOs) in the CTLDB, each DBO of the plurality of DBOs comprises a code block, one or more actions performed on the code block, and a tenant ID associated with the code block.

4. The one or more NTCRSM of claim 3, wherein the set of instructions is operable to:
determine code blocks stored in the CTLDB having a performance issue and one or more actions that resolved the performance issue; and
identify, as the performance predictions, performance improvements for code blocks determined to be similar to one another, the performance improvements being based on the one or more actions that resolved the performance issue.

5. The one or more NTCRSM of claim 1, wherein, when the one or more source code documents comprise new source code and the identified code block type is the query language code block, the set of instructions is operable to:
parse the identified code block into individual fields;
identify each parsed field;
determine an estimated resource consumption for each identified field based on code blocks and associated query times stored in the CTLDB;
determine, as the performance predictions, a predicted resource consumption for the one or more source code documents based on aggregation of the estimated resource consumption for each identified field; and generate the feedback to at least include the predicted resource consumption.

6. The one or more NTCRSM of claim 1, wherein, when the one or more source code documents comprise new source code and the identified code block type is the data logging code block, the set of instructions is operable to:

identify information types to be stored in a tenant space when the code block is to be executed;

determine, based on code blocks and associated information types stored in the CTLDB, whether storage of any of the identified information types is permitted by a selected compliance scheme;

determine the performance predictions to be one or more information types that are not permitted to be stored according to the selected compliance scheme; and generate the feedback to at least indicate the performance predictions and at least one mechanism that would prevent the one or more information types from being stored when the code block is executed.

7. The one or more NTCRSM of claim 1, wherein, when the one or more source code documents comprise new source code and the identified code block type is the system call or callout code block, the set of instructions is operable to:

identify external data sources to be accessed when the code block is to be executed;

determine, based on code blocks and associated external data sources stored in the CTLDB, whether the identified external data sources are trusted data sources or untrusted data sources;

determine the performance predictions to be ones of the identified external data sources that are untrusted data sources; and generate the feedback to at least indicate the performance predictions and a reason why the ones of the identified external data sources are untrusted.

8. The one or more NTCRSM of claim 1, wherein, when the one or more source code documents comprise new source code and the identified code block type is the exception code block, the set of instructions is operable to:

identify another code block stored in the CTLDB that comprises a same functionality as the exception code block;

generate a first semantic tree based on the exception code block;

generate a second semantic tree based on the other code block;

identify a path from the first semantic tree to the second semantic tree based on a comparison of the first semantic tree with the second semantic tree; and generate the feedback to at least indicate the path.

9. The one or more NTCRSM of claim 8, wherein the set of instructions is operable to:

determine a Euclidean distance between the first semantic tree and the second semantic tree; and determine a difference between the first semantic tree and the second semantic tree based on the Euclidean distance.

10. The one or more NTCRSM of claim 1, wherein the set of instructions is operable to:

generate the feedback to include suggested performance improvements based on the performance predictions, the performance improvements comprising: suggested code fixes to avoid throwing an exception, code fixes to avoid noncompliant data logging, code fixes to avoid obtaining data from untrusted sources, or suggested query optimizations to improve query execution speed.

11. A computer system to be employed in a multi-tenant system, the computer system comprising:

a network interface; and a processor system communicatively coupled with the network interface, the processor system to:

generate a plurality of analysis engines that correspond to respective ones of a plurality of code block types, the plurality of code block types including a query language code block, a data logging code block, a system call or callout code block, and an exception code block;

parse one or more source code documents into a set of code blocks; and for each code block of the set of code blocks:

identify a code block type of the code block from among the plurality of code block types, select, from among the plurality of analysis engines, an analysis engine that corresponds to the identified code block type, operate the selected analysis engine to:

analyze the code block based on other code blocks stored in a cross-tenant learnt database (CTLDB) and runtime logs in the CTLDB associated with the other code blocks, the other code blocks being parsed from other source code documents developed for or by other tenant platforms belonging to other tenants of a plurality of tenants, and the runtime logs indicate operations or actions performed by the other tenants when developing the other source code, and determine performance predictions for the code block based on the analysis of the code block, and generate a consolidated feedback based on the determined performance predictions for each respective code block; and the network interface to:

obtain the one or more source code documents from one or more developer systems associated with a tenant of the plurality of tenants in the multi-tenant system, the one or more source code documents being executable to provide a tenant platform belonging to the tenant, and send the consolidated feedback to the one or more developer systems before or during a compile time of the one or more source code documents.

12. The computer system of claim 11, wherein, when the one or more source code documents comprise existing source code, the processor system is to:

generate a set of clusters, each cluster of the set of clusters comprising runtime logs of a plurality of runtime logs that are similar to one another, and each of the plurality of runtime logs indicating actions performed by individual tenants of the plurality of tenants on source code documents and results of the performed actions; and identify categories associated with each cluster, wherein the network interface is to obtain the plurality of runtime logs.

13. The computer system of claim 12, wherein the processor system is to:

parse the runtime logs of each cluster into a plurality of code blocks;

perform, for each code block of the plurality of code blocks, a reverse lookup operation to identify a tenant identifier (ID) of a tenant to which the code block belongs; and control storage of a plurality of database objects (DBOs) in the CTLDB, each DBO of the plurality of DBOs comprises a code block, one or more actions performed on the code block, and a tenant ID associated with the code block.

14. The computer system of claim 13, wherein the processor system is to:
    determine code blocks stored in the CTLDB having a performance issue and one or more actions that resolved the performance issue; and
    identify, as the performance predictions, the performance improvements for code blocks determined to be similar to one another, the performance improvements being based on the one or more actions that resolved the performance issue.

15. The computer system of claim 11, wherein, when the one or more source code documents comprise new source code and the identified code block type is the query language code block, the processor system is to:
    parse the one or more source code documents into individual fields;
    identify each parsed field;
    determine an estimated resource consumption for each identified field based on code blocks and associated query times stored in the CTLDB;
    determine, as the performance predictions, a predicted resource consumption for the one or more source code documents based on aggregation of the estimated resource consumption for each identified field; and
    generate the feedback to at least include the predicted resource consumption.

16. The computer system of claim 11, wherein, when the one or more source code documents comprise new source code and the identified code block type is the data logging code block, the processor system is to:
    identify information types to be stored in a tenant space when the code block is to be executed;
    determine, based on code blocks and associated information types stored in the CTLDB, whether storage of any of the identified information types is permitted by a selected regulatory scheme;
    determine the performance predictions to be one or more information types that are not permitted to be stored according to the selected regulatory scheme; and
    generate the feedback to at least indicate the performance predictions and at least one mechanism that would prevent the one or more information types from being stored when the code block is executed.

17. The computer system of claim 11, wherein, when the one or more source code documents comprise new source code and the identified code block type is the system call or callout code block, the processor system is to:
    identify external data sources to be accessed when the code block is to be executed;
    determine, based on code blocks and associated external data sources stored in the CTLDB, whether the identified external data sources are trusted data sources or untrusted data sources;
    determine the performance predictions to be ones of the identified external data sources that are untrusted data sources; and
    generate the feedback to at least indicate the performance predictions and a reason why the ones of the identified external data sources are untrusted.

18. The computer system of claim 11, wherein, when the one or more source code documents comprise new source code and the identified code block type is the exception code block, the processor system is to:
    identify another code block stored in the CTLDB that comprises a same functionality as the exception code block;
    generate a first semantic tree based on the exception code block;
    generate a second semantic tree based on the other code block;
    identify a path from the first semantic tree to the second semantic tree based on a comparison of the first semantic tree with the second semantic tree; and
    generate the feedback to at least indicate the path.

19. The computer system of claim 18, wherein the processor system is to:
    determine a Euclidean distance between the first semantic tree and the second semantic tree; and
    determine a difference between the first semantic tree and the second semantic tree based on the Euclidean distance.

20. The computer system of claim 11, wherein the processor system is to:
    generate the feedback to include suggested performance improvements based on the performance predictions, the performance improvements comprising: suggested code fixes to avoid throwing an exception, code fixes to avoid noncompliant data logging, code fixes to avoid obtaining data from untrusted sources, or suggested query optimizations to improve query execution speed.

* * * * *